(12) United States Patent
Lin et al.

(10) Patent No.: US 7,006,988 B2
(45) Date of Patent: Feb. 28, 2006

(54) METHOD OF COLLABORATION COMMERCE

(75) Inventors: Cheng-Jen Lin, Taoyuan (TW);
Hsiu-Chu Wu, Taoyuan (TW)

(73) Assignee: Mitac International Corp., Hsinchu (TW)

( * ) Notice: Subject to any disclaimer, the term of this patent is extended or adjusted under 35 U.S.C. 154(b) by 803 days.

(21) Appl. No.: 09/737,549

(22) Filed: Dec. 18, 2000

(65) Prior Publication Data

US 2002/0077919 A1    Jun. 20, 2002

(51) Int. Cl.
*G06F 17/60* (2006.01)

(52) U.S. Cl. .......................................... 705/26; 705/29

(58) Field of Classification Search ................ 705/26, 705/27, 28, 29
See application file for complete search history.

(56) References Cited

U.S. PATENT DOCUMENTS

| | | | | |
|---|---|---|---|---|
| 5,666,493 A | * | 9/1997 | Wojcik et al. ................ | 705/26 |
| 5,710,887 A | * | 1/1998 | Chelliah et al. .............. | 705/26 |
| 6,263,317 B1 | * | 7/2001 | Sharp et al. .................. | 705/26 |
| 6,393,332 B1 | * | 5/2002 | Gleditsch et al. ............ | 700/99 |
| 6,625,616 B1 | * | 9/2003 | Dragon et al. ............ | 707/104.1 |
| 6,721,713 B1 | * | 4/2004 | Guheen et al. ................ | 705/1 |
| 2002/0042755 A1 | * | 4/2002 | Kumar et al. ................. | 705/26 |

FOREIGN PATENT DOCUMENTS

GB    2302427 A    *  1/1997

OTHER PUBLICATIONS

Repath, Kathleen M. et al.: "KnowledgeBase manufacturing", Assembly Automation, v14, n4, 1994, pp. 21-25.*

* cited by examiner

*Primary Examiner*—Jeffrey A. Smith
(74) *Attorney, Agent, or Firm*—Birch, Stewart, Kolasch & Birch, LLP

(57) ABSTRACT

A collaboration commerce method, which, with customers not knowing the whole collaboration commerce operation procedure, lowers the operation and executive costs among different supplier to achieve the optimal gains of collaboration commerce. The method comprises the steps of: a customer ordering a commodity through a web page; transmitting the commodity ordering information to a collaboration server; transmitting the commodity ordering information further to a plurality of enterprise resource planning servers; executing the integrated operation step of the plurality of enterprise resource planning server to generate a customized table list; sending the customized table list back to the customer for confirmation.

15 Claims, 4 Drawing Sheets

METHOD OF COLLABORATION COMMERCE

BACKGROUND OF THE INVENTION

1. Field of Invention

The present invention relates to a collaboration commerce method and, in particular, to an optimally operating trading method that achieves collaboration commerce with clients not knowing the detailed procedure of the whole collaboration operation.

2. Related Art

The E-commerce and the Internet have become a fast-growing trend in the modem society. Their developments can be simply classified into three parts: business to consumer (B2C), the Intranet, and business to business (B2B).

For an enterprise to have a successful E-commerce, the current business model has to be reconsidered and modified to find out a proper point for E-commerce to enter. The important factors to be considered are the increase of operation efficiency (such as speeding up order processing, shortening commodity distribution, growing gains, increasing customer satisfaction, lowering stocks, and making successful marketing strategies) and providing customers more extra value services. It is also important to help commerce partners to combine up-, mid-, and downstream resources and to progress toward E-commerce business together.

The development and prevalence of the Internet force one to also consider such non-Internet-related subjects as the enterprise resource planning (ERP) system and the supply chain management (SCM).

The ERP system evolves from the manufacturing resource planning (MRPII) of manufacturers. The great advantage is that it integrates various business-running systems, including sale, manufacture, finance, accounting, human resource, and logistic support, so that all information in the enterprise can be sent to all members correctly in real time. The technical structure is a new three-level structure (a front display level, a logic operation level, and a rear data level) and modularized devices so that the system can easily expand, maintain and increase its efficiency.

Currently, most E-commerce only achieves exchange and integration of data in upstream and downstream. There is still a long road for E-commerce to be able to simultaneously integrate and even optimize up-, mid-, and downstream resources because even if all information are distributed without difficulty, many other limitations and time issues make the optimization by computers impossible.

Therefore the SCM system is invented to utilize artificial intelligence in an attempt to find out an optimal solution quickly instead of using the conventional mathematics. Using this method does not only save users from writing any mathematical formula but also can find a proper solution within a short time.

Due to the shortened lifecycles and lead times of products nowadays, document transmission speeds more faster than ever so that the build to order (BTO) model gradually evolves toward the configure to order (CTO) model. By combining with the supply chain inside an enterprise and the supply chains of up-, mid-, downstream suppliers, an operation model that integrates external collaboration has become an important subject of modern E-commerce.

Therefore, for manufacturers the development in the E-commerce environment has to combine virtual business interactions (e.g., B2B and B2C) and real resource supply (e.g., ERP and SCM) in order to achieve the object of collaboration commerce (CC).

SUMMARY OF THE INVENTION

The present invention provides a collaboration commerce method. Its principal object is to integrate enterprises resource planning (ERP) and supply chain management (SCM) of different suppliers so that when a customer orders a commodity through a network the main server can provide an optimal order arrangement. The customer does not need to know of the detailed operation procedure of the collaboration commerce. The invention can lower the operational and executive costs among different suppliers so as to achieve the optimal gain by collaboration commerce.

The method according to the invention at least includes the following steps: a customer ordering a commodity through a web page; transmitting the commodity ordering information to a collaboration server; transmitting the commodity ordering information further to a plurality of enterprise resource planning servers through the collaboration server; executing the integrated operation step of the plurality of enterprise resource planning server to generate a customized table list; sending the customized table list back to the customer for confirmation.

Other features and advantages of the present invention will be apparent from the following detailed description, which proceeds with reference to the accompanying drawings.

BRIEF DESCRIPTION OF THE DRAWINGS

In the various drawings, the same references relate to the same elements.

DETAILED DESCRIPTION OF THE INVENTION

The invention proposes a collaboration commerce (CC) trading method. It provides a plurality of application servers as the base for integrating a rear data level. The web ordering of any OEM/ODM customer-end web server is taken as a front display level. Through the omnipresent linking of the Internet and utilizing the logic operation level of the invention, an end user is provided with the front display level to access data at the rear data level. Thus, the present invention provides a trading method that integrates information, commodity and monetary exchanges.

Figure 1:
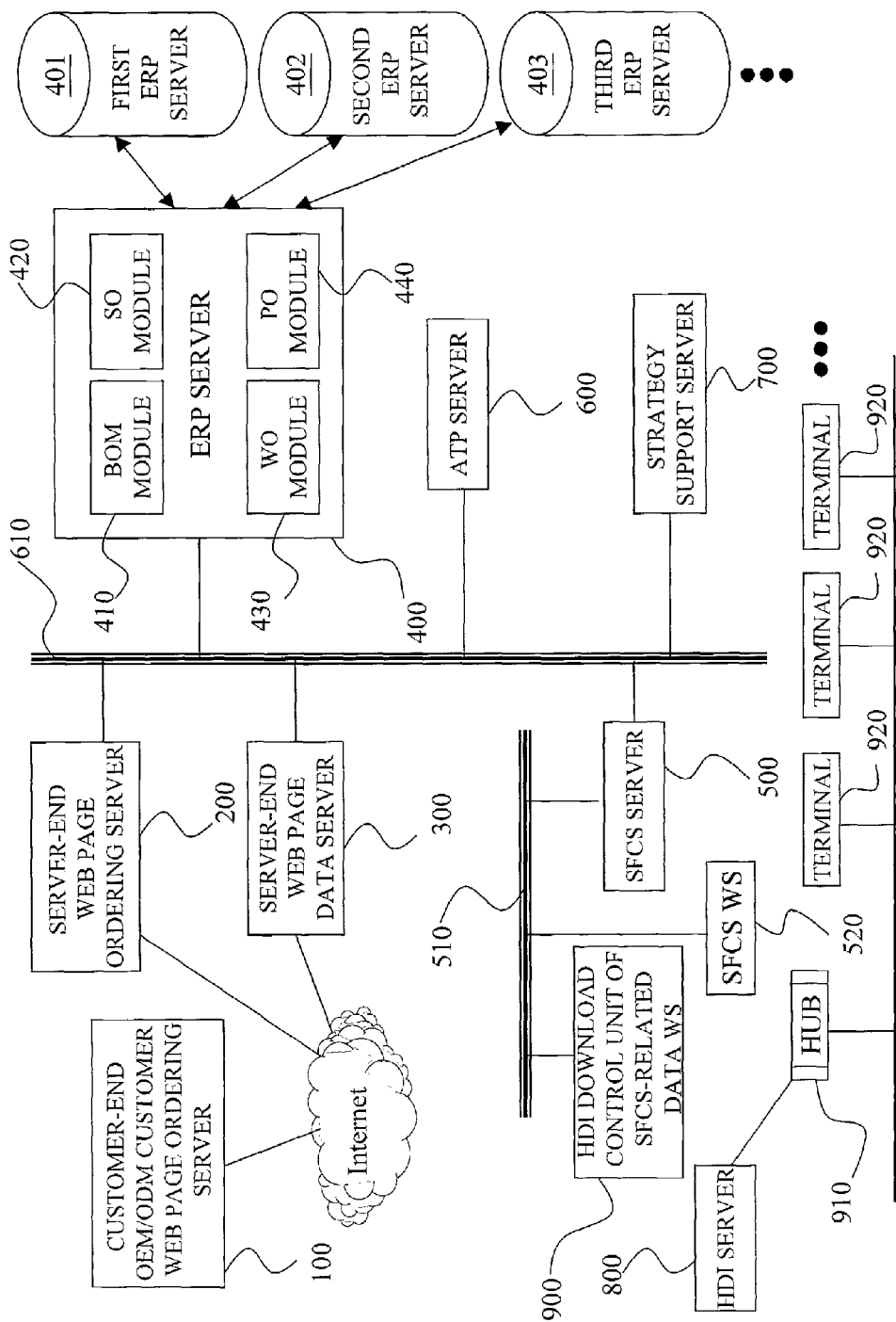
FIG. 1 shows a network system structure of the collaboration commerce disclosed herein.

A preferred embodiment is provided hereinbelow to explicitly illustrate how to implement the disclosed method that utilizes an OEM/ODM customer-end web server as the front display level for an end user to order computer-related products, achieving the object of CC. The trading method is further described with reference to FIG. 1:

The network system structure of the invention includes the following application servers:

1. Through the link of the Internet, the invention includes (1) an OEM/ODM customer-end web ordering server 100; (2) a server-end web ordering server 2001; and (3) a server-end web information server 300.

(1) OEM/ODM customer-end web ordering server 100: Its main function is to provide customer data to the server-end web ordering server 200 and to hyperlink to the server-end web ordering server 200 so as to select a configure to order (CTO) web ordering server (now shown). It allows a customer to enter and set basic data, including making a manufacturing model listed contract, confirming a product order (PO) and relevant basic data. It further returns the setting-related basic data from the CTO web ordering server to the OEM/ODM customer-end web ordering server 100 for the customer to confirm the ordering information.

(2) Server-end web ordering server 200: It obtains the latest product information from an enterprise resource planning (ERP) server 400 (to be described in detail later) by dynamically updating data all the time. It obtains the customer data from the OEM/ODM customer-end web ordering server 100 and accepts customer's orders. At the same time of accepting a customer's order, it also has to confirm all product information (including stock amounts at various places, models, etc) stored in the ERP server 400 and clearly indicates whether the order commodities should be separately shipped or partially shipped. If it is an ODM customer, then the prices will be in US dollars; whereas if it is an ordinary customer, then the price will be shown in the local currency. Finally, the customer's orders are returned to the ERP server 400. Through the link to the ERP server 400, the sales order (SO) and the product order (PO) can be retrieved. The above data are then sent back to the OEM/ODM customer-end web ordering server 100 for the customer to confirm.

(3) Server-end web data server 300: It connects to a shop floor control system (SFCS) server 500 so as to obtain an SFCS status. An available to promise (ATP) server 600 is established and links to the ERP server 400 to satisfy the requirement of quick response (QR) or efficient consumer response (ECR). Therefore, on the other hand, the server-end web data server 300 has to obtain the SO status and ATP status from the ERP server 400 to provide the ODM/customer the SO status and shipping information.

2. According to the disclosed method, through the linking of an ERP back bone 610, the system further includes (4) an enterprise resource planning (ERP) server 400; (5) a shop floor control system (SFCS) server 500; (6) an available to promise (ATP) server 600; and (7) a strategy support server 700.

(4) The ERP server 400: It contains four modules: (a) a bill of material (BOM) module 410, (b) a sales order (SO) module 420, (c) a work order (WO) module 430, and (d) a product order (PO) module 440.

(a) The BOM module 410: Its first function is to configure the basic initial data for opening product types, i.e., the basic initial data for the ERP server 400 to open product types, and upload them to the CTO web ordering servers in each local ERP server (a first ERP server 401, a second ERP server 402, a third ERP server 403, etc). Each local ERP server (401, 402, 403) can be an ERP located at different areas. The basic initial data of the product types include the commodity category, commodity description, customer PN#, etc. A table is also established to display such things as commissioned commodities (software/hardware), necessary commodities (software/hardware), optional commodities (software/hardware), peripheral accessories and the download controls of the operational code and the host digital interface (HDI) of material kits.

A second function of the BOM module 410 is to configure and generate a product BOM so as to individually check the product types in the selected configuration. It further generates a single stock keeping unit (SKU) code (project code +sequence number) and configures the BOM (software/hardware).

(b) The SO module 420: Its primary function is to open basic initial data and to provide a price list for the ODM/customer. It also automatically generate an SO function, which obtains a "configured result" from the server-end web ordering server 200 and generates an SO table head and detailed list. The PO and SO of the ODM/customer are compared. It also controls whether the ordered commodities should be shipped separately or partially. Another function is to generate an invoice through the EDI 856 or EDI810 protocol to the customer who orders. In addition, the module can further generate a packaging list, shipping tags, mailing amounts, transmit an SO status to the server-end web data server 300, and register the shipping information and shipper information.

(c) The WO module 430. Its primary function is to automatically open a WO and release the WO after obtaining material configuration information from the ATP server 600. It also generates a path to the SKU vertex. Another function of it is to transmit "WO-SO information" to the SFCS server 500 and to transmit "kit file information" to the SFCS server 500 and the strategy support server 700. Moreover, the module can generate E-mail to the ODM/customer to check the preparation status of materials.

(d) The PO module 440: Since many setting values of the HDI have to be unified and standardized, therefore the invention provides a PO module 440 to mainly maintain the standards of the HDI.

(5) The SFCS server 500: It mainly provides the WO inquiry for the present invention so as to meet the requirement of ECR and the ATP trend. The server 500 further links the SFCS-related data warehouse (WS) 520 and the download control of the HDI through a link 510 to obtain the interface information of the WO and the SO. It also obtains "kit file information" from the ERP server 400 and generates a serial number (SN) for each unit. In particular, the server 500 further prints the bar code information obtained by scanning IP addresses and retrieve the interface information of the SN-SW from the SFCS data WS for the download control of the HDI.

(6) The ATP server 600: It mainly retrieves the information of a supply/demand status from the ERP server 400 and provides browsing of BOM so as to create a WO. It also executes material capacity promise (MCP) so as to distribute valid material information to the WO. If material distribution is finished, the server 600 further provides a suggestion of whether the WO function should be closed. Finally, it returns the ATP result back to the ERP server 400 to provide customers the promised information.

(7) The strategy support server 700: It mainly provides the strategies and controls of the whole collaboration commerce. Through the integration of all the above servers, business intelligence (BI) with sufficient references is formed to fully utilize information science to quickly and actively discover market information and to take proper reactions among a lot of data. The huge amount of data is usually the trading records every day or the data assembly of the databases of all the servers. Therefore the whole idea is to build a combination of such techniques as the data WS, dataming, and cube.

The data in the server 700 are stored and queued in the first in first out (FIFO) principle. The kit SN is obtained from the SFCS server 500 and can be linked with the operational code to locate the SN. The location will be highlighted for further control. Therefore, one can use the SN to obtain the information of the material kit on a display rack. The trading data of the material kit can be accumulated from the WO and updated data in the ERP server 400. The information is sent back to the data WS for the reference of business. Therefore, the server 700 has to be scheduled to update the information of material kits on selection racks on the daily basis so that the system can know when to replenish the material kits on the selection racks according to the data WS.

3. According to the disclosed method, there further contains an HDI server 800 that connects the supply chain inside the enterprise and the supply chains of the up-, mid-, and downstream suppliers. A hub 910 is used herein to connect each client 920 (PC or workstation) through an HDI back bone 810 so that the hub 910 and the system supply chain are combined together to form a collaboration commerce structure. The HDI server 800 connects to the SFCS server 500 through an HDI download control unit 900 of the SFCS data WS.

The HDI server 800 sets the SFCS data WS and the compatibility table of the HDI file of the system. It further provides conversion and transmission functions, and obtains an "HDI IP control information" from the SFCS data WS for offering optional HDI files and IP addresses download.

Figure 2:
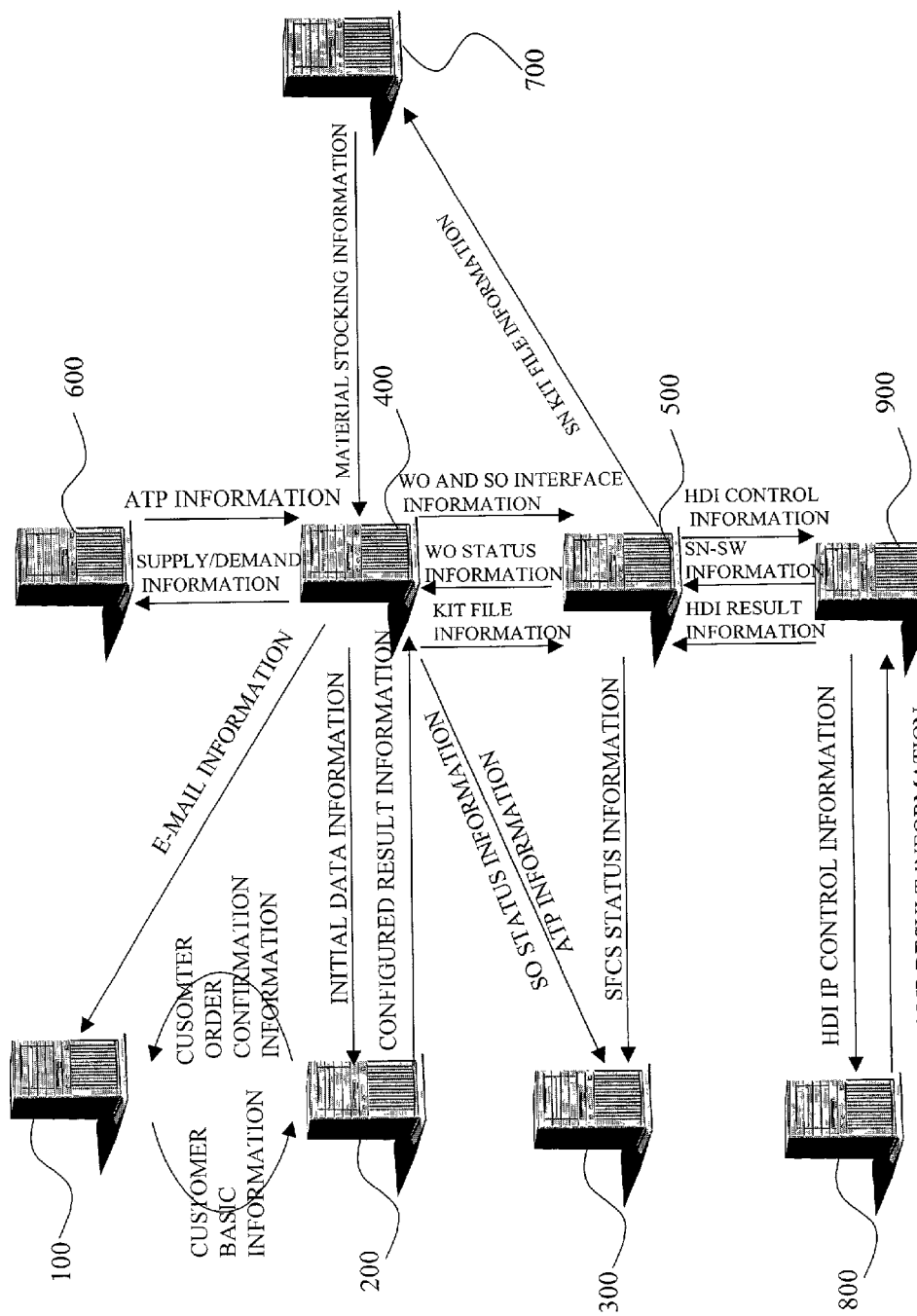
FIG. 2 shows a system software structure of the collaboration commerce disclosed herein.

After explaining the function of each of the above server, the correlation of these servers in integrated operation is to be described individually hereinafter. With reference to FIG. 2, the various servers use different interfaces to transmit information, forming the message transmission of the collaboration commerce. Various types of information are explained as follows:

(1) The customer information: It is transmitted from the OEM/ODM customer-end web ordering server 100 to the server-end web ordering server 200. The information contains basic data of the customer (including the name, address, country code, and E-mail account of the customer) and a PO# of the ODM customer.

(2) The customer PO confirmation information: It is returned by the server-end web ordering server 200 to the OEM/ODM customer-end web ordering server. The information contains the PO#, a product and quantity ordered, an ODM price and a currency exchange rate, a shipping method/charge, an ordering date/shipping days/normal arriving date, etc.

(3) The supply/demand information: It is sent from the ERP server 400 to the ATP server 600. The information contains a BOM, a bill of stock, a production quantity, a sales quantity, and the priority so as to wait for the ATP server 600 to make promise responses.

(4) The available to promise (ATP) information: The information is sent by the ATP server 600 back to the ERP server 400. When the supply/demand configuration is completed, a WO is provided to a new SO; whereas if the supply/demand configuration is not finished, an ATP date is estimated. Furthermore, the ATP information is transmitted from the ERP server 400 to the server-end web data server 300.

(5) The initial data information: It is transmitted from the ERP server 400 to the server-end web ordering server 200. The information contains the ODM/customer price list in the SO module, main items in the BOM module, configuration items, conflictions and a currency exchange rate.

(6) The configured result information: It is transmitted from the server-end web ordering server 200 to the ERP server 400. The information contains the customer basic data, a product and quantity ordered, the ODM prices and the currency exchange rate, the ODM/customer PO#, the server-end SO, the shipping method, the ordering date/shipping days/normal arrival date, and shipping separately/partially.

(7) The sales order (SO) status information: It is transmitted from the ERP server 400 to the server-end web data server 300. The information contains information for opening, releasing or completing WO, shipping information and shipper information.

(8) The kit file information: It is sent from the ERP server 400 to the SFCS server 500. The information contains a WO#, an operational code, a product code and a quantity (software/hardware).

(9) The SN kit file information: It is sent from the SFCS server 500 to the strategy support server 700. The information contains a WO#, a serial number (SN) range, an operational code, a product code, and a quantity (software/hardware).

(10) The E-mail information: It is transmitted from the ERP server to the OEM/ODM customer-end web ordering server 100. The information contains the customer PO#, the server-end SO# and a scheduled shipping date.

(11) The shop floor control system (SFCS) status information: The information is transmitted from the SFCS server to the server-end web data server 300. The information contains an SO#, a WO#, an operational code, a production quantity, an error code, a yield, and a maintenance record.

(12) The material TX information: It is sent from the strategy support server 700 to the ERP server 400. The information contains a WO#, a ship number, a storage account number, a TX format, part numbers (PNs), a quantity and a transaction_status flag.

(13) The SN-SW information: An SN is transmitted from the HDI download control unit 900 of the SFCS data WS to the SFCS server 500.

(14) The HDI control information: It is transmitted from the SFCS server 500 to the HDI download control unit 900 of the SFCS data WS. The information contains an SN, the SW part numbers transmitted from the SFCS server to the SFCS data WS.

(15) The HDI result information: It is transmitted from the HDI download control unit 900 of the SFCS data WS to the SFCS server 500. The information contains the SN and the error codes transmitted from the SFCS data WS to the SFCS server (cyclic redundancy check (CRC) reports).

(16) The HDI IP control information: It is transmitted from the HDI download control unit 900 of the SFCS data WS to the HDI server 800. The information contains IP addresses and the SW part numbers transmitted from the SFCS data WS to the HDI server.

(17) The HDI IP result information: It is transmitted from the HDI server 800 to the HDI download control unit 900 of the SFCS data WS. The information contains IP addresses and the error codes (CRC report) from the HDI server to the SFCS data WS.

(18) The WO and SO information: It is transmitted from the ERP server 400 to the SFCS server 500. The information contains a WO, an SO, finish good (FG) PNs, the number of days required and an order quantity.

(19) The WO status information: It is transmitted from the SFCS server 500 to the ERP server 400. The information contains a WO, an SO, FG PNs and a return quantity.

The method proposed in the invention can be considered as an idea of knowledge management (KM), which primarily uses information technology to aid and establish enterprise knowledge sharing in order to adapt to the competitive environment that is always changing and based upon knowledge. Information technology helps in more effectively establishing, sharing, searching knowledge, and even solving problems. It can further integrate and categorize all sorts of files for the convenience of searching, automatically building catalogs and even answering questions.

Figure 3:
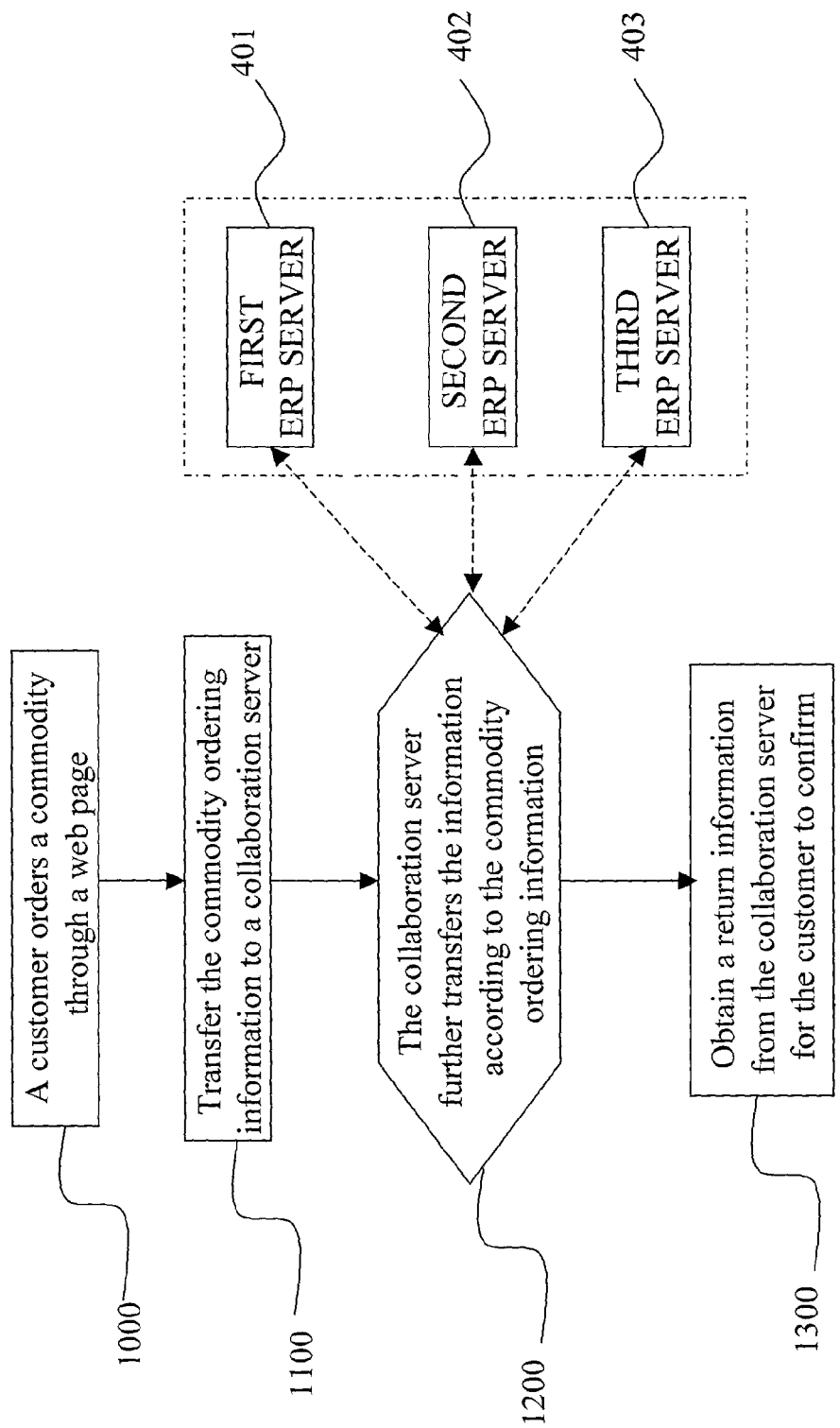
FIG. 3 shows the trading procedure in the front display level according to the collaboration commerce disclosed herein.

Referring to FIG. 3, it illustrates the procedure for a customer to complete the commodity order through an OEM/ODM server-end web ordering interface, replacing the conventional commodity trading model. It is worth mentioning that in the supply chains of the whole collaboration commerce, different areas have different products. There are corresponding specific assembly and shipping routes according to the ordering area. Furthermore, different products have different supporting up-, mid-, downstream suppliers.

Therefore, the supply chain management (SCM) among various suppliers had better to be optimized so as to share the market information. This is achieved by having a host supplier to directly contact with customers. Through the information technology, the information from customers can immediately and directly feed back to the host supplier. However, each individual supplier has a different distribution plan to satisfy the requirement of CTO according to the management of the whole collaboration commerce (CC). Thus, a customer may not be able to know of the detailed operation procedure in the CC (in fact, the customer does not need to learn the detail). From the viewpoint of collaboration commerce, this can achieve the optimized operation.

In view of the foregoing, the upshot of the invention is in integrating end users, product types, distribution mechanisms and the collaboration among suppliers. The trading procedure at the front display level is explained as follows:

First, a customer order a commodity through a web page (step 1000); wherein the design of the web page enables the check mechanism of the customer's credit history, has an electronic ordering system (EOS), and provides a commodity catalog, commodity descriptions, commodity prices, etc. The commodity ordering information is then transmitted to a collaboration server (step 1100), which integrates the server-end web ordering server 200 and the ERP server 400. The collaboration server hyperlinks to the host supplier server of the commodity to determine the distribution direction of the commodity ordering information. Following the direction of a collaboration program, the collaboration server make the corresponding information transmission according to the commodity ordering information (step 1200); that is, the information is uploaded to the CTO web ordering server (not shown) of each local ERP server (e.g., the first ERP server 401, the second ERP server 402, and the third ERP server 403, etc). In particular, through each ERP system and relevant SCM, information transmission in the logic operation level is completed (the details have been described hereinbefore and are not repeated here). Finally, return information is obtained from the collaboration server for the customer to confirm (step 1300). The return information contains the customer basic data, the ordered commodity and quantities, the ODM price and the currency exchange rate, the shipping method, the ordering date/shipping days/normal arriving date, and the messages of shipping separately/partially. This then completes the whole collaboration commerce trade.

Figure 4:
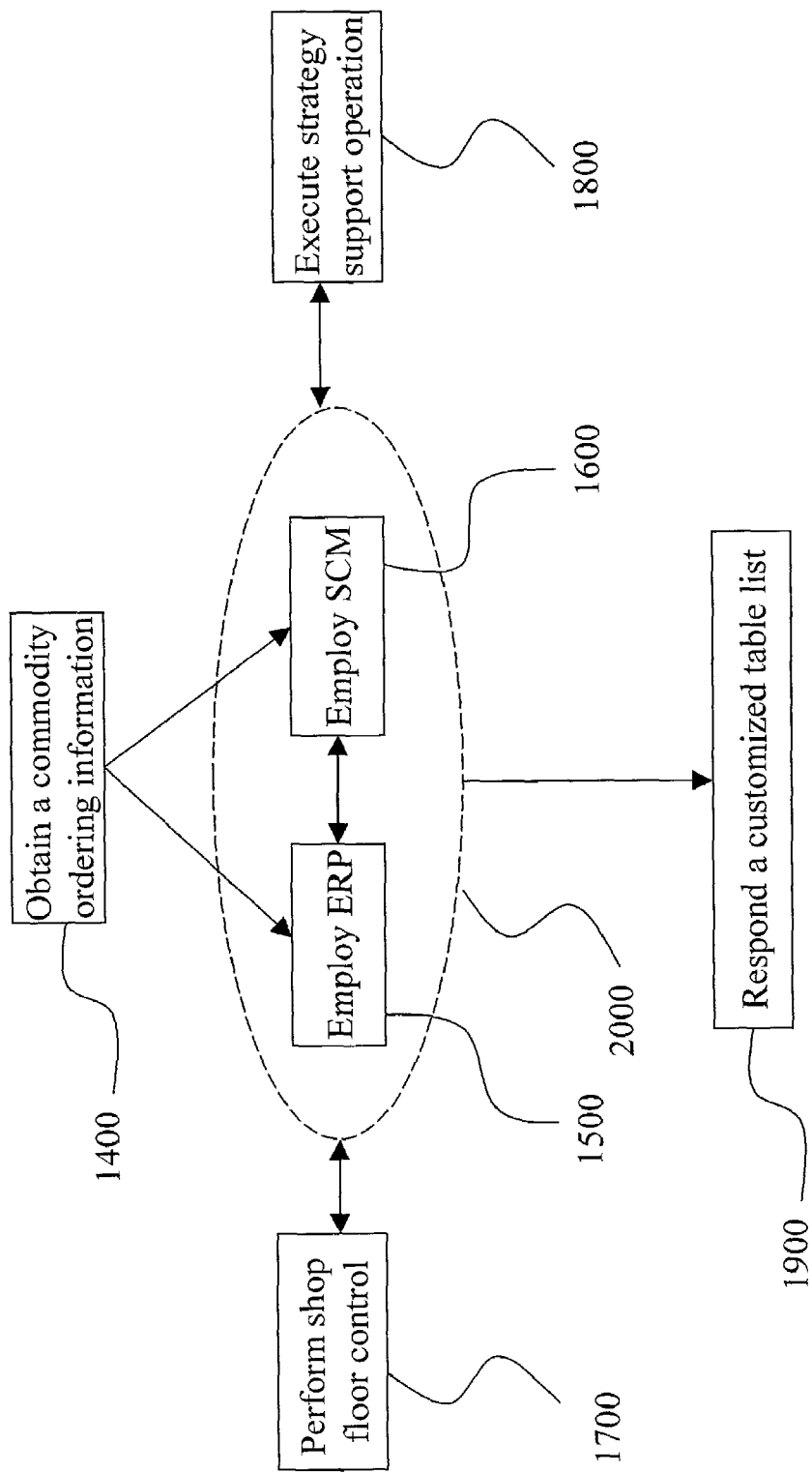
FIG. 4 shows a message transmission procedure in the rear data level according to the collaboration commerce disclosed herein.

The above paragraph describes the trading procedure at the front display level according to the disclosed CC method. Referring to FIG. 4, the message transmission procedure at the read data level is explained as follows:

After obtaining the commodity ordering information (step 1400), the commodity ordering information is directed to the ERP (step 1500) and the collaboration SCM (step 1600). The collaboration ERP and collaboration SCM integrate systems of different platforms and areas. They contain several different gateway nodes and host nodes. To satisfy the CTO requirement with proper ATP, shop floor control monitoring is employed (step 1700) to understand the optimized reaction needed for manufacturing and production. Through an executive strategy support operation (step 1800), the system can predict and control the whole CC operation. Therefore, under such a CC operation a customized table list is returned (step 1900) to change the ordering model of the bill to order (BTO) system 2000 to a CTO customized table list.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A collaboration commerce trading method completing configure-to-order (CTO) production by ordering a commodity through a network and providing transmissions and responses of the ordering information, the method comprising the steps of:
   a customer ordering a commodity through a web page;
   transmitting the commodity ordering information to a collaboration server;
   transmitting the commodity ordering information through the collaboration server to a plurality of enterprise resource planning (ERP) servers, which include:
      a bill of material (BOM) module configuring basic initial data related to said commodity ordering information to open product types and the BOM for manufacturing products;
      a sales order (SO) module opening basic initial data, listing a customer-end price list, and automatically generating an SO;
      a work order (WO) module automatically opening a WO, obtaining material configuration information from an ATP server, and generating an E-mail to the customer, checking the preparation status of materials; and
      a product order (PO) module maintaining HDI (host digital interface) standards;
   wherein the plurality of ERP servers connect via an ERP back bone to:
      a shop floor control system (SFCS) server;
      an available to promise (ATP) server; and
      a strategy support server;
   executing the integrated operation of the plurality of ERP servers to generate a customized table list; and
   returning the customized table list for the customer to confirm.

2. The method of claim 1, wherein the design of the web page includes a mechanism for checking the credit history of the customer and an electronic ordering system (EOS).

3. The method of claim 2, wherein the EOS provides a commodity catalog, commodity descriptions and commodity prices.

4. The method of claim 1, wherein the collaboration server hyperlinks to a host supplier server of the commodity.

5. The method of claim 1, further comprising an SFCS back bone connecting to the data warehouse (WS) and server of the SFCS.

6. The method of claim 1, wherein the SFCS server provides searches of the WOs.

7. The method of claim 1, wherein the ATP server is used to retrieve supply/demand status information from the ERP servers.

8. The method of claim 1, wherein the strategy support server provides the strategies and controls for the collaboration commerce (CC).

9. The method of claim 1, wherein the data format in the strategy support server can be stored and queued in the principle of first in first out (FIFO).

10. The method of claim 1 further comprising an HDI back bone connecting supply chain data of a host server, supply chain data of up-, mid-, and downstream suppliers, and a hub.

11. The method of claim 10, wherein the supply chain data are stored in each end machine.

12. A method completing configure-to-order (CTO) production by ordering a commodity through a network and providing available to promise (ATP) transmissions and responses of the ordering information, the method comprising the steps of:
   obtaining a customer's demand information from a server-end web ordering server;
   obtaining supply information of a product from an enterprise resource planning (ERP) server, which includes:
   a bill of material (BOM) module configuring basic initial data related to said ordering information to open product types and the BOM for manufacturing products;
   a sales order (SO) module opening basic initial data, lists a customer-end price list, and automatically generating an SO;
   a work order (WO) module opening the WO, obtaining material configuration information from an ATP server, and generating an E-mail to the customer, checking the preparation status of materials; and
   a product order (PO) module, which maintains HDI (Host Digital Interface) standards;
   wherein the ERP server connects via an ERP back bone to:
   a shop floor control system (SFCS) server;
   the available to promise (ATP) server; and
   a strategy support server;
   transmitting supply/demand information to the available to promise (ATP) server;
   the ATP server executing a supply/demand configuration;
   providing a confirmed sales order (SO) to the customer when the ATP server completes the supply/demand configuration; and
   estimating an ATP date to the customer when the ATP server cannot complete the supply/demand configuration.

13. The method of claim 12, wherein the customer's demand information includes customer order confirmation information comprising a PO of the customer, a product and quantity ordered, a price and a currency exchange rate, a shipping method/charge, and an ordering date/shipping days/normal arrival date.

14. The method of claim 13, wherein the order confirmation information further comprises configured result information.

15. The method of claim 12, wherein the product supply information comprises a customer-end price list, main items in an BOM module, configuration items, conflictions, and a currency exchange rate.

* * * * *